April 17, 1928.
F. L. SARAZIN
1,666,608
COMBINED BOLT AND NUT LOCK
Filed March 12, 1926
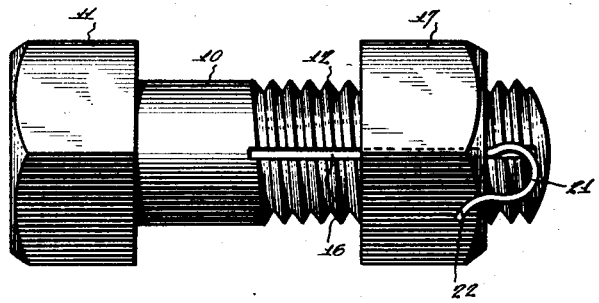
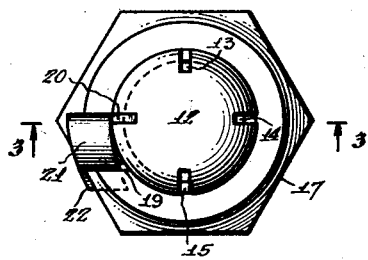
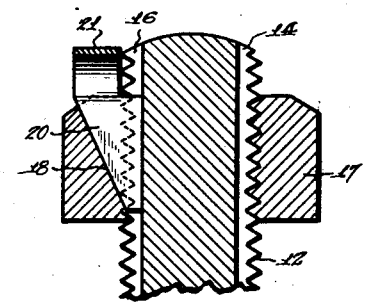
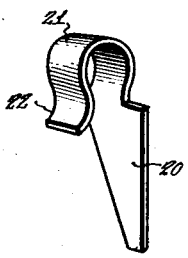
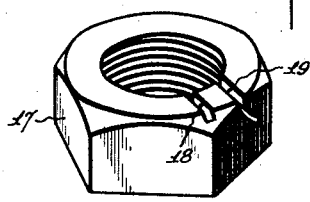
WITNESSES
INVENTOR
Frank L. Sarazin
BY
ATTORNEYS Patented Apr. 17, 1928.

1,666,608

UNITED STATES PATENT OFFICE.

FRANK L. SARAZIN, OF WABASHA, MINNESOTA.

COMBINED BOLT AND NUT LOCK.

Application filed March 12, 1926. Serial No. 94,263.

This invention relates to a combined nut and bolt lock.

An object of the invention is to provide a simple and efficient means whereby a nut can be locked in any desired position on a bolt, without any likelihood of its being worked loose by vibration or jarring of the bolt.

The invention is illustrated in the drawings, of which—

Figure 1 is a side elevation of the device with the nut locked in place;

Figure 2 is an end elevation;

Figure 3 is a section taken on the line 3—3 of Figure 2;

Figure 4 is a perspective view of the lock plate;

Figure 5 is a perspective view of a nut.

The form of the invention shown in the drawings is a preferred form, although it is understood that modifications in the construction and arrangement of the parts and in the character of the materials used may be adopted without departing from the spirit of the invention as set forth in the appended claims.

In its general aspect I provide a bolt with a groove and a nut with a wedge shaped or inclined groove, these grooves adapted to be brought into registry. A locking member is then disposed in the registered grooves; this member includes a wedge-shaped body portion 20 and has an outer end which is made of curved spring metal which is bent over, the outer curved end of the locking member being adapted to be inserted in an auxiliary and curved slot in the face of the nut and preferably being sprung into said auxiliary slot to hold the locking member firmly in position by friction and thereby hold the nut in definite position on the bolt regardless of the amount of vibration or jarring action to which the nut and bolt may be subjected.

In the preferred form of the invention, I show a bolt 10 having a head 11 and a threaded shank 12. The bolt is provided preferably with four longitudinal grooves 13, 14, 15 and 16 along the threaded portion 12. The nut 17 is provided with a slot 18 which is adapted to be brought into registry with one of the four above mentioned slots as the nut is threaded on the bolt.

The nut on its outer face is also provided with an auxiliary slot 19 which is preferably curved as shown in Figure 5, and opens out through the side face of the nut. In order to lock the nut on the bolt I provide a locking member having a wedge shaped body portion 20 adapted to lie in the slot 18 of the nut, which as seen in Figure 3 is also wedge shape or inclined. It also lies naturally in registry with one of the four slots in the bolt. The upper end 21 of the lock plate is of spring metal and curved, especially the outer ends thereof. In order to dispose the locking member as shown in Figure 3, the outer curved spring end 22 is pressed toward the body portion sufficient to bring it into alinement with auxiliary slot 19 in the nut, whereupon pressing inwardly on the loop 21 causes the plate to be moved to its full, engaged position. To remove the locking member, the fingers take hold of the loop and press the end of the plate toward the body portion pulling outwardly at the same time, whereupon the locking member can be pulled out of the slots 18 and 19. The lock plate will keep the bolt and nut in alinement and engagement of the end of the lock plate in the auxiliary slot of the nut will prevent the lock plate from being jarred out of its groove or slot.

What I claim is:

1. The combination of a bolt having a longitudinal groove in its side, a nut having a series of longitudinal grooves in its bore, and a curved transverse groove in its front face, said curved groove being curved in the direction of its length and substantially parallel with the bore groove, and extending through a side face of the nut, the longitudinal grooves of the bolt and nut adapted to be brought into registry, and a locking member having a body portion adapted to seat within said registered grooves, the outer free end of the locking member bent to form a resilient loop, the free end of which is adapted to be inserted into the transverse groove in the front face of the nut and be held therein by friction, whereby to hold the locking member in active position.

2. In combination with a bolt and a nut having longitudinal slots adapted to be alined, the slot of the nut being inclined and wedge-shaped, of a locking member comprising a wedge shaped body portion adapted to be disposed in the said alined slots, the nut also having a longitudinally curved transverse auxiliary slot in its front face, said auxiliary slot opening through the side face of the nut, the free end of the locking member being formed of spring metal and bent into a resilient loop having a curved free end adapted to be inserted in the auxiliary slot to position the wedge shaped body portion of the locking member in the alined slots.

FRANK L. SARAZIN.